(12) United States Patent
Gwock

(10) Patent No.: US 10,129,504 B2
(45) Date of Patent: Nov. 13, 2018

(54) METHOD AND SYSTEM FOR MEASURING QUALITY OF VIDEO CALL

(71) Applicant: LINE Corporation, Shinjuku-ku, Tokyo (JP)

(72) Inventor: Jung nam Gwock, Seongnam-si (KR)

(73) Assignee: Line Corporation, Tokyo (JP)

( * ) Notice: Subject to any disclaimer, the term of this patent is extended or adjusted under 35 U.S.C. 154(b) by 0 days.

(21) Appl. No.: 15/674,595

(22) Filed: Aug. 11, 2017

(65) Prior Publication Data

US 2018/0048860 A1 Feb. 15, 2018

(30) Foreign Application Priority Data

Aug. 12, 2016 (KR) .......................... 10-2016-0102938

(51) Int. Cl.
*H04N 7/15* (2006.01)
*H04N 7/14* (2006.01)

(52) U.S. Cl.
CPC .................................. *H04N 7/147* (2013.01)

(58) Field of Classification Search
None
See application file for complete search history.

(56) References Cited

U.S. PATENT DOCUMENTS

| 2013/0260893 A1 | 10/2013 | Shin et al. |
| 2013/0332543 A1 | 12/2013 | Shin et al. |
| 2014/0019540 A1 | 1/2014 | Shin et al. |
| 2015/0113063 A1* | 4/2015 | Liu ........................ H04L 65/403 709/204 |
| 2015/0142702 A1* | 5/2015 | Nilsson .................. G06N 5/048 706/11 |

(Continued)

FOREIGN PATENT DOCUMENTS

| KR | 20050020431 A | 3/2005 |
| KR | 20050094218 A | 9/2005 |

(Continued)

OTHER PUBLICATIONS

"Measure of Image Quality" http://homepages.inf.ed.ac.uk/rbf/CVonline/LOCAL_COPIES/VELDHUIZEN/node18.html.

*Primary Examiner* — Creighton Smith
(74) *Attorney, Agent, or Firm* — Harness, Dickey & Pierce, P.L.C.

(57) ABSTRACT

Provided is a quality-of-video call measuring method and system. The quality-of-video call measuring method may include capturing a display screen of a second electronic device that performs video call with a first electronic device over network. The captured display screen may include a frame image associated with first electronic device and a frame image associated with second electronic device. The frame image associated with first electronic device may include a first time value. The frame image associated with second electronic device may include a second time value. The quality-of-video call measuring method may include analyzing the captured display screen, and extracting the first time value included in the frame image associated with first electronic device and the second time value included in the frame image associated with second electronic device; and calculating at least one parameter indicating a quality of video call using the extracted first and second time values.

20 Claims, 9 Drawing Sheets

(56) References Cited

U.S. PATENT DOCUMENTS

2017/0142257 A1* 5/2017 Sampath .............. H04M 3/5191
2017/0251275 A1* 8/2017 Fujii .................. H04N 21/6373

FOREIGN PATENT DOCUMENTS

| KR | 20070081663 A | 8/2007 |
| KR | 20080099903 A | 11/2008 |
| KR | 20100014020 A | 2/2010 |
| WO | WO-2015/0065001 A1 | 5/2015 |

* cited by examiner

METHOD AND SYSTEM FOR MEASURING QUALITY OF VIDEO CALL

CROSS-REFERENCE TO RELATED APPLICATION(S)

This U.S. non-provisional application claims the benefit of priority under 35 U.S.C. § 119 to Korean Patent Application No. 10-2016-0102938 filed on Aug. 12, 2016, in the Korean Intellectual Property Office (KIPO), the entire contents of which are incorporated herein by reference.

BACKGROUND

Field

One or more example embodiments relate to a method, apparatus, system for measuring a quality of video call, and a non-transitory computer-readable recording medium storing a computer program to perform a quality-of-video call measuring method in conjunction with an electronic device.

Description of Related Art

A video call refers to a call that users make that allows for the viewing of the callers' faces on their respective screens and enables the users to exchange conversations in real time by transferring video and sound.

An example of a factor indicating a quality of such video call may be frame per second (FPS) that is suggested from a service provider providing a video call service. However, the actual quality of video call may vary due to various factors, such as the network environment and the like. Thus, in an actual video call service, it may be difficult to maintain the quality of video call according to FPS suggested by the service provider. The video call quality factors, such as FPS, suggested by the service provider may not accurately represent the quality of video call.

Also, a related art using a reference video relates to a method of measuring a quality of video call. For example, the related art technology may, when a substitute video is transmitted from a receiving video terminal to a sending video terminal, the sending video terminal may transmit the substitute video to a quality-of-video call measurer of a sending side and the quality-of-video call measurer of the sending side compares the substitute video with a reference video and measures the call quality. However, in the related art, the quality of video call may be measured through simple comparison between a transmitted video and a comparison video and may not suggest objective parameters for measuring the quality of video call.

SUMMARY

One or more example embodiments provide a quality-of-video call measuring method and system that may include a specific time value in each of a frame image associated with a first electronic device and a frame image associated with a second electronic device performing a video call with the first electronic device over a network, the frame images being displayed on a display screen of the second electronic device, may capture a display screen of the second electronic device, may extract the specific time values, and may provide objective parameters for measuring a quality of video call using the extracted specific time values, and a non-transitory computer-readable recording medium storing a computer program to perform the quality-of-video call measuring method in conjunction with an electronic device.

One or more example embodiments also provide a quality-of-video call measuring method and system that may provide various objective parameters, for example, an end-to-end delay between a first electronic device and a second electronic device, a frame per second (FPS), a frame interval, and a peak signal-to-noise ratio (PSNR), and a non-transitory computer-readable recording medium storing a computer program to perform the quality-of-video call measuring method in conjunction with an electronic device.

According to an aspect of at least one example embodiment, there is provided a quality-of-video call measuring method of a quality-of-video call measuring apparatus, the method including capturing, using at least one processor, a display screen of a second electronic device that performs a video call with a first electronic device over a network, the captured display screen comprising at least one first frame image associated with the first electronic device and at least one second frame image associated with the second electronic device, and the first frame image comprising a first time value and the second frame image comprising a second time value; analyzing, using the at least one processor, the captured display screen, and extracting the first time value included in the first frame image and the second time value included in the second frame image; and calculating, using the at least one processor, at least one parameter indicating a quality of the video call based on the extracted first time value and the extracted second time value.

According to an aspect of at least one example embodiment, there is provided an apparatus for measuring a quality of video call, the apparatus including at least one processor configured to execute computer-readable instructions included in a memory. The at least one processor is configured to capture a display screen of a second electronic device that performs a video call with a first electronic device over a network, the captured display screen comprising a first frame image associated with the first electronic device and a second frame image associated with the second electronic device, and the first frame image comprising a first time value and the second frame image comprising a second time value, analyze the captured display screen, and to extract the first time value included in the first frame image and the second time value included in the second frame image, and calculate at least one parameter indicating a quality of video call based on the extracted first time value and the extracted second time value.

According to an aspect of at least one example embodiment, there is provided a non-transitory computer-readable storage medium storing computer readable instructions that, when executed by at least one processor, cause the at least one processor to perform a quality-of-video call measuring method in conjunction with an electronic device, the method including capturing a display screen of a second electronic device that performs a video call with a first electronic device over a network, the captured display screen comprising a first frame image associated with the first electronic device and a second frame image associated with the second electronic device, and the first frame image comprising a first time value and the second frame image comprising a second time value; analyzing the captured display screen, and extracting the first time value included in the first frame image and the second time value included in the second frame image; and calculating at least one parameter indicating a quality of video call based on the extracted first time value and the extracted second time value.

According to some example embodiments, it is possible to include a specific time value in each of a frame image associated with a first electronic device and a frame image associated with a second electronic device performing a video call with the first electronic device over a network, the images being displayed on a display screen of the second electronic device, to capture a display screen of the second electronic device, to extract the specific time values, and to provide objective parameters for measuring a quality of video call using the extracted specific time values.

Also, according to some example embodiments, it is possible to provide various objective parameters, for example, an end-to-end delay between a first electronic device and a second electronic device, an FPS, a frame interval, and a PSNR, etc.

Further areas of applicability will become apparent from the description provided herein. The description and specific examples in this summary are intended for purposes of illustration only and are not intended to limit the scope of the present disclosure.

BRIEF DESCRIPTION OF THE FIGURES

Example embodiments will be described in more detail with regard to the figures, wherein like reference numerals refer to like parts throughout the various figures unless otherwise specified, and wherein.

Figure 1:
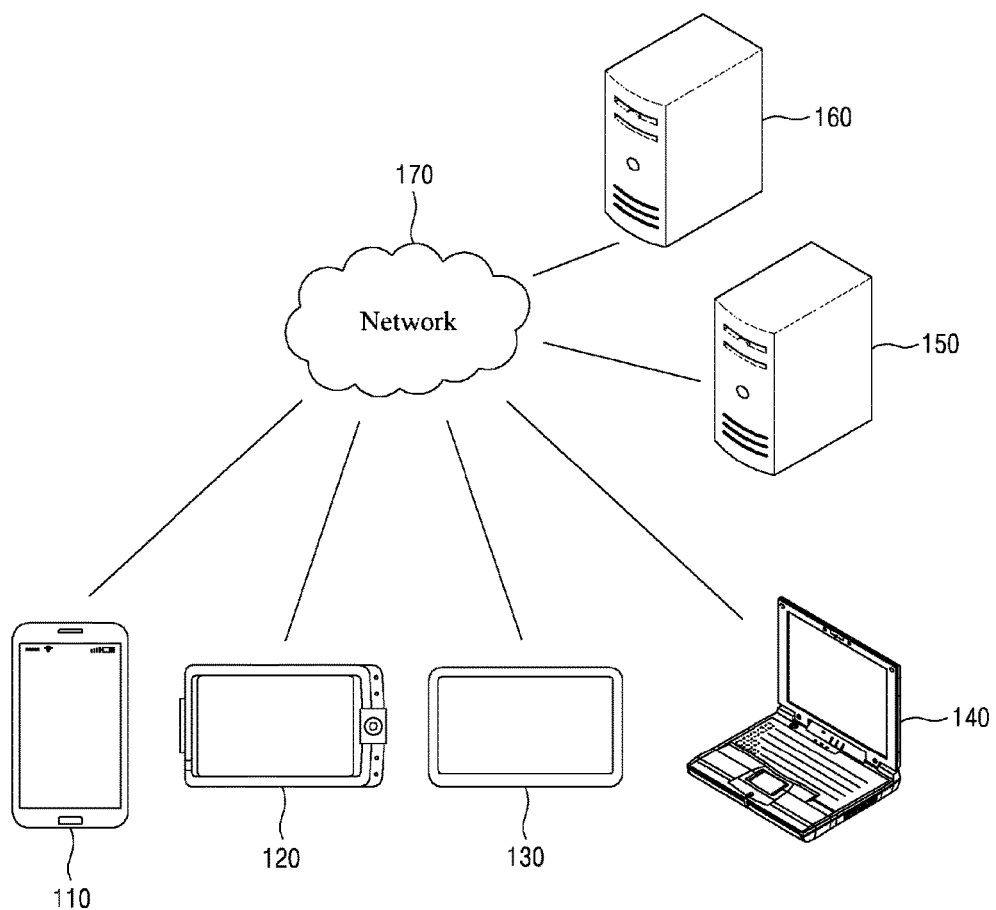
FIG. 1 is a diagram illustrating an example of a network environment according to at least one example embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware or a combination of hardware and software. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

A quality-of-video call measuring apparatus according to example embodiments may be configured through an electronic device to be described in the following, and a quality-of-video call measuring method according to example embodiments may be performed by the electronic device. For example, an electronic device may be configured as a quality-of-video call measuring apparatus separate from a first electronic device and a second electronic device that perform a video call, may capture a display screen of the second electronic device and may calculate a parameter for measuring a quality of video call. As another example, the electronic device may correspond to the second electronic device and may be a device in which an application configured as a computer program according to example embodiments is installed and executed. In this case, the electronic device may perform the quality-of-video call measuring method under control of the executed application. The computer program may be stored in a non-transitory computer-readable recording medium to perform the quality-of-video call measuring method in conjunction with the electronic device.

FIG. 1 is a diagram illustrating an example of a network environment according to at least one example embodiment. Referring to FIG. 1, the network environment includes a plurality of electronic devices 110, 120, 130, and 140, a plurality of servers 150 and 160, and a network 170. FIG. 1 is provided as an example only and thus, the number of electronic devices and/or a number of servers are not limited thereto and may be a lesser or greater amount.

Each of the plurality of electronic devices 110, 120, 130, and 140 may be a fixed terminal or a mobile terminal configured as a computer device. For example, the plurality of electronic devices 110, 120, 130, and 140 may be a smartphone, a mobile phone, a personal navigation device, a computer, a laptop computer, a digital broadcasting terminal, a personal digital assistant (PDA), a portable multimedia player (PMP), a tablet personal computer, a wearable device, an Internet of Things (IoT) device, a gaming console, a smart device, and the like. As another example, at least one of the plurality of electronic devices 110, 120, 130, and 140 may be a separate quality-of-video call measuring apparatus configured to measure the quality of video call. Although FIG. 1 illustrates a smartphone as an example of the electronic device 110, it is provided as an example only. In the example embodiments, the electronic device 110 may indicate one of various devices that may communicate with other electronic devices 120, 130, and/or 140, and/or the servers 150 and/or 160 over the network 170 in a wired communication manner and/or in a wireless communication manner.

The communication scheme is not particularly limited and may include a communication method that uses a near field communication between devices as well as a communication method using a communication network, for example, a mobile communication network, the wired Internet, the wireless Internet, a broadcasting network, a satellite network, etc., which may be included in the network 170. For example, the network 170 may include at least one of network topologies that include networks, for example, a personal area network (PAN), a local area network (LAN), a campus area network (CAN), a metropolitan area network (MAN), a wide area network (WAN), a broadband network (BBN), the Internet, and the like. Also, the network 170 may include at least one of network topologies that include a bus network, a star network, a ring network, a mesh network, a star-bus network, a tree or hierarchical network, and the like. However, it is only an example and the example embodiments are not limited thereto.

Each of the servers 150 and 160 may be configured as a computer apparatus or a plurality of computer apparatuses that provides computer readable instructions, codes, files, contents, services, and the like through communication with the plurality of electronic devices 110, 120, 130, and/or 140 over the network 170. For example, the server 150 may be a system that provides a first service to the plurality of electronic devices 110, 120, 130, and 140 connected through the network 170, and the server 160 may be a system that provides a second service to the plurality of electronic devices 110, 120, 130, and 140 connected through the network 170, but the example embodiments are not limited thereto. In detail, the server 150 may be a system that provides a video call service to the plurality of electronic devices 110, 120, 130, and 140 as the first service. Also, the server 160 may be a system that provides an installation file for an application for the video call service or an installation file for a quality-of-video call measurement application to the plurality of electronic devices 110, 120, 130, and 140 as the second service.

Figure 2:
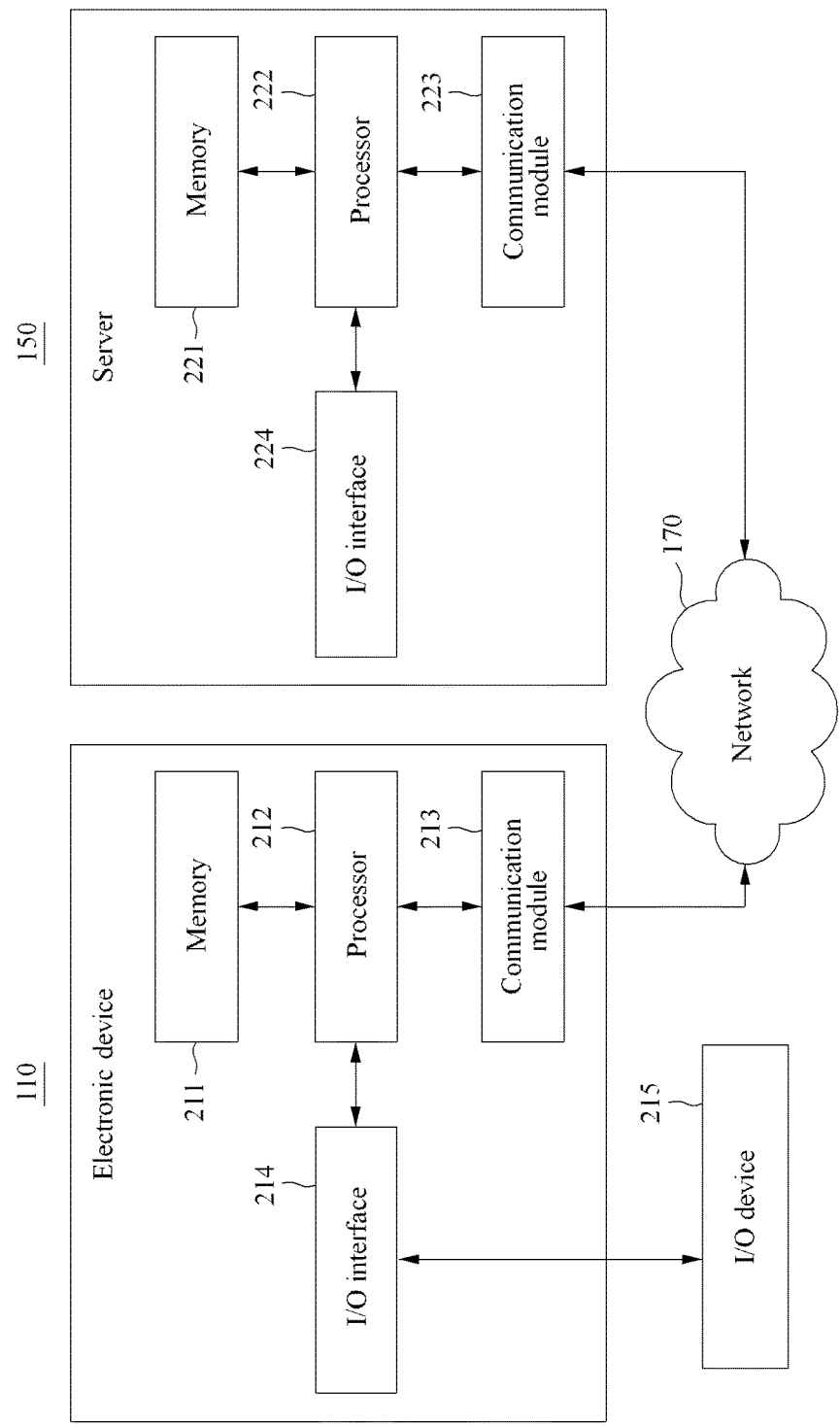
FIG. 2 is a block diagram illustrating an example of a configuration of an electronic device and a server according to at least one example embodiment.

FIG. 2 is a block diagram illustrating an example of a configuration of an electronic device and a server according to at least one example embodiment. FIG. 2 illustrates a configuration of the electronic device 110 as an example for a single electronic device and illustrates a configuration of the server 150 as an example for a single server. The same or similar components may be applicable to other electronic devices 120, 130, and/or 140, or the server 160, and also to still other electronic devices or still other servers.

Referring to FIG. 2, the electronic device 110 may include a memory 211, at least one processor 212, a communication module 213, and an input/output (I/O) interface 214, but is not limited thereto, and the server 150 may include a memory 221, at least one processor 222, a communication module 223, and an I/O interface 224, but is not limited thereto. The memory 211, 221 may include a permanent mass storage device, such as random access memory (RAM), read only memory (ROM), a disk drive, solid state memory, etc., as a non-transitory computer-readable storage medium. Here, a permanent mass storage device such as ROM and a disk drive may be included in the electronic device 110 or the server 150 as a separate permanent storage device separate from the memory 211, 221. Also, an OS and at least one program code (e.g., computer readable instructions), for example, a code for an application installed on the electronic device 110 to provide a specific service, a browser installed and executed on the electronic device 110, etc., may be stored in the memory 211, 221. Such software components may be loaded from another non-transitory computer-readable storage medium separate from the memory 211, 221 using a drive mechanism. The other non-transitory computer-readable storage medium may include, for example, a floppy drive, a disk, a tape, a Blu-ray/DVD/CD-ROM drive, a solid state drive, a memory card, etc. According to other example embodiments, software components may be loaded to the memory 211, 221 through the communication module 213, 223, instead of, or in addition to, the non-transitory computer-readable storage medium. For example, at least one program may be loaded to the memory 211, 221 based on a program, for example, the application, installed by files provided over the network 170 from developers or a file distribution system, for example, the server 150, which provides an installation file of the application.

The processors 212, 222 may be configured to process computer-readable instructions, for example, the aforementioned at least one program code, of a computer program by performing basic arithmetic operations, logic operations, and I/O operations. The computer-readable instructions may be provided from the memories 211, 221 and/or the communication modules 213, 223 to the processors 212, 222. For example, the processors 212, 222 may be configured to execute received instructions in response to the program code stored in the storage device, such as the memories 211, 222.

The communication modules 213, 223 may provide a function for communication between, for example, the electronic device 110 and the server 150 over the network 170, and may provide a function for communication between the electronic device 110 and/or the server 150 and other electronic devices, for example, the electronic device 120 and/or another server, such as, the server 160, etc. For example, the processor 212 of the electronic device 110 may transfer a request created based on a program code stored in the storage device such as the memory 211, to the server 150 over the network 170 under control of the communication module 213. Conversely, a control signal, an instruction, content, a file, etc., provided under control of the processor 222 of the server 150 may be received at the electronic device 110 through the communication module 213 of the electronic device 110 by going through the communication module 223 and the network 170. For example, a control signal, an instruction, content, a file, etc., of the server 150 received through the communication module 213 may be transferred to the processor 212 or the memory 211, and content, a file, etc., may be stored in a storage medium, for example, the aforementioned permanent storage device, further includable in the electronic device 110.

The I/O interface 214 may be a device used for interface with an I/O device 215. For example, an input device may include a keyboard, a mouse, a microphone, a camera, etc., and an output device may include a device, such as a display, speaker, printer, etc. As another example, the I/O interface 214 may be a device for interface with an apparatus in which an input function and an output function are integrated into a single function, such as a touch screen. The I/O device 215 may be configured as a single device with the electronic device 110. Also, the I/O interface 224 of the server 150 may be a device for interface with a device (not shown) for input or output that may be connected to the server 150 or included in the server 150. In detail, when processing instructions of the computer program loaded to the memory 211, the processor 212 of the electronic device 110 may display a service screen configured using data provided from the server 150 or the electronic device 120, or may display content on a display through the I/O interface 214.

According to other example embodiments, the electronic device 110 and the server 150 may include a greater or lesser number of components than a number of components shown in FIG. 2. For example, the electronic device 110 may include at least a portion of the I/O device 215, or may further include other components, for example, a transceiver, a global positioning system (GPS) module, a camera, a variety of sensors, a database, and the like. In detail, if the electronic device 110 is a smartphone, the electronic device 110 may be configured to further include a variety of components, for example, an accelerometer sensor, a gyro sensor, a camera, various physical buttons, a button using a touch panel, an I/O port, a haptic feedback device for vibration, etc., which are generally included in the smartphone.

Figure 3:
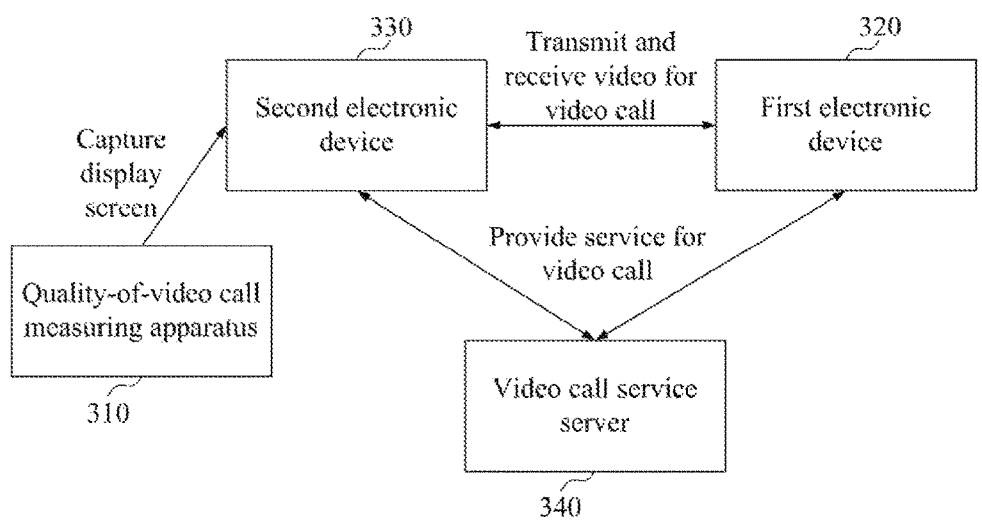
FIG. 3 is a diagram illustrating an example of an entire system for measuring a quality of video call according to at least one example embodiment.

FIG. 3 is a diagram illustrating an example of an entire system for measuring a quality of video call according to at least one example embodiment. FIG. 3 illustrates a quality-of-video call measurement apparatus 310, a first electronic device 320, a second electronic device 330, and a video call service server 340. Each of the quality-of-video call measuring apparatus 310, the first electronic device 320, and the second electronic device 330 may be configured as the aforementioned electronic device 110, and the video call service server 340 may be configured as the aforementioned server 150, but the example embodiments are not limited thereto.

Here, the first electronic device 320 and the second electronic device 330 may be two terminals that perform (e.g., communicate through, establish, connect, etc.) a video call over the network 170, and may transmit and receive video for the video call (e.g., receive video data associated with the video call, etc.), however the example embodiments are not limited thereto and there may be a greater or lesser number of electronic devices configured to engage in the video call. Here, the video call service server 340 may be an apparatus (and/or a plurality of apparatuses) to provide a service so that the video call may be performed between the first electronic device 320 and the second electronic device 330. The example embodiments do not relate to technology regarding a method to provide a video call. Technologies for providing a video call between two terminals are understood as the known art by one skilled in the art. A further description related thereto is omitted.

In at least some of the example embodiments, each of the frames of a video transmitted and received between the first electronic device 320 and the second electronic device 330 may include a desired and/or preset time value. Each of the frames of the video may be displayed on each of a screen of the first electronic device 320 and a screen of the second electronic device 330 with a corresponding time value (e.g., a timestamp value, etc.).

Here, the quality-of-video call measuring apparatus 310 may calculate parameters indicating the quality of the video call by extracting and using the time values included in the frames of the video. To this end, for example, the quality-of-video call measuring apparatus 310 may capture a display screen of the second electronic device 330. That is, a first time value and a frame image transmitted from the first electronic device 320 to the second electronic device 330 may be displayed on the display screen of the second electronic device 330 captured by the quality-of-video call measuring apparatus 310. Also, a second time value and a frame image transmitted from the second electronic device 330 to the first electronic device 320 may be displayed on the captured display screen of the second electronic device 330. Here, the quality-of-video call measuring apparatus 310 may analyze the captured display screen through video processing, may extract the first time value and the second time value, and then may calculate various parameters for measuring the quality of video call using the extracted first time value and second time value.

Figure 4:
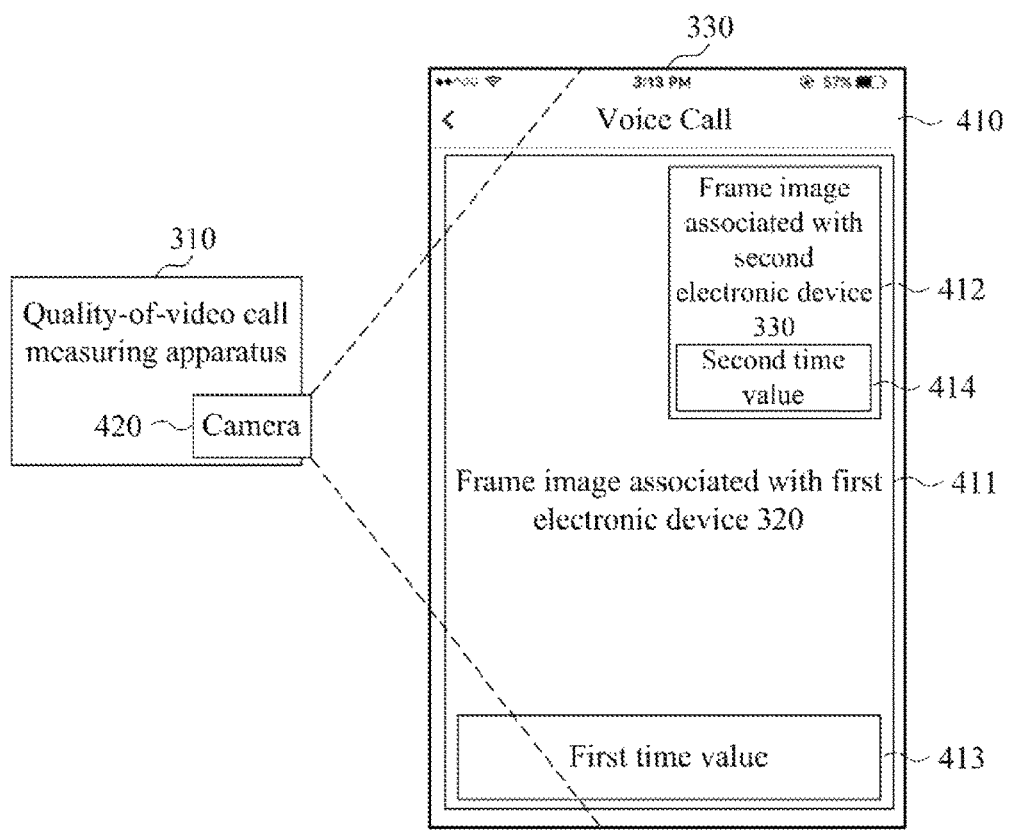
FIG. 4 is a diagram illustrating an example of a display screen of a second electronic device according to at least one example embodiment.

FIG. 4 is a diagram illustrating an example of a display screen of a second electronic device according to at least one example embodiment, but the example embodiments are not limited thereto. Referring to FIG. 4, a display screen 410 is an example of a screen of the second electronic device 330. A frame image 411 associated with the first electronic device 320 that is received from the first electronic device 320 and a frame image 412 associated with the second electronic device 330 of a video to be transmitted from the second electronic device 330 to the first electronic device 320 are displayed on the display screen 410. Also, since the frame image 411 associated with the first electronic device 320 includes a first time value 413, the first time value 413 may be further displayed on the display screen 410. Since the frame image 412 associated with the second electronic device 330 includes a second time value 414, the second time value 414 may be further displayed on the display screen 410. Additionally, the example embodiments are not limited to a video call between two electronic devices and the display screen 410 may include frame images transmitted by additional electronic devices that may be part of the same video call as the video call between the first electronic device 320 and the second electronic device 330, or may include frame images transmitted as part of at least one separate video call.

Here, the quality-of-video call measuring apparatus 310 may include a camera 420, and may photograph, video, and/or otherwise capture the display screen 410 of the second electronic device 330 through the camera 420. Also, the quality-of-video call measuring apparatus 310 may extract the first time value 413 and the second time value 414 from the captured display screen 410 using image processing of the captured image of the display screen 410, and may calculate various parameters for measuring the quality of video call based on the extracted time values associated with the frame images, e.g., the first time value 413 and the second time value 414. Frame images and time values displayed on the display screen 410 may vary over time. Accordingly, the quality-of-video call measuring apparatus 310 may continuously photograph and capture the display screen 410 and may continuously extract and use time values, or may periodically photograph and capture the display screen 410 and may periodically extract and use time values. For example, if a service provider of a video call service services a video call at 30 frames per second (FPS), the quality-of-video call measuring apparatus 310 may capture the display screen 410 at 30 FPS. That is, the quality-of-video call measuring apparatus 310 may capture the display screen at a setting based on the settings of the video call service, e.g., 30 frames may be captured from the display screen 410 per second.

Figure 5:
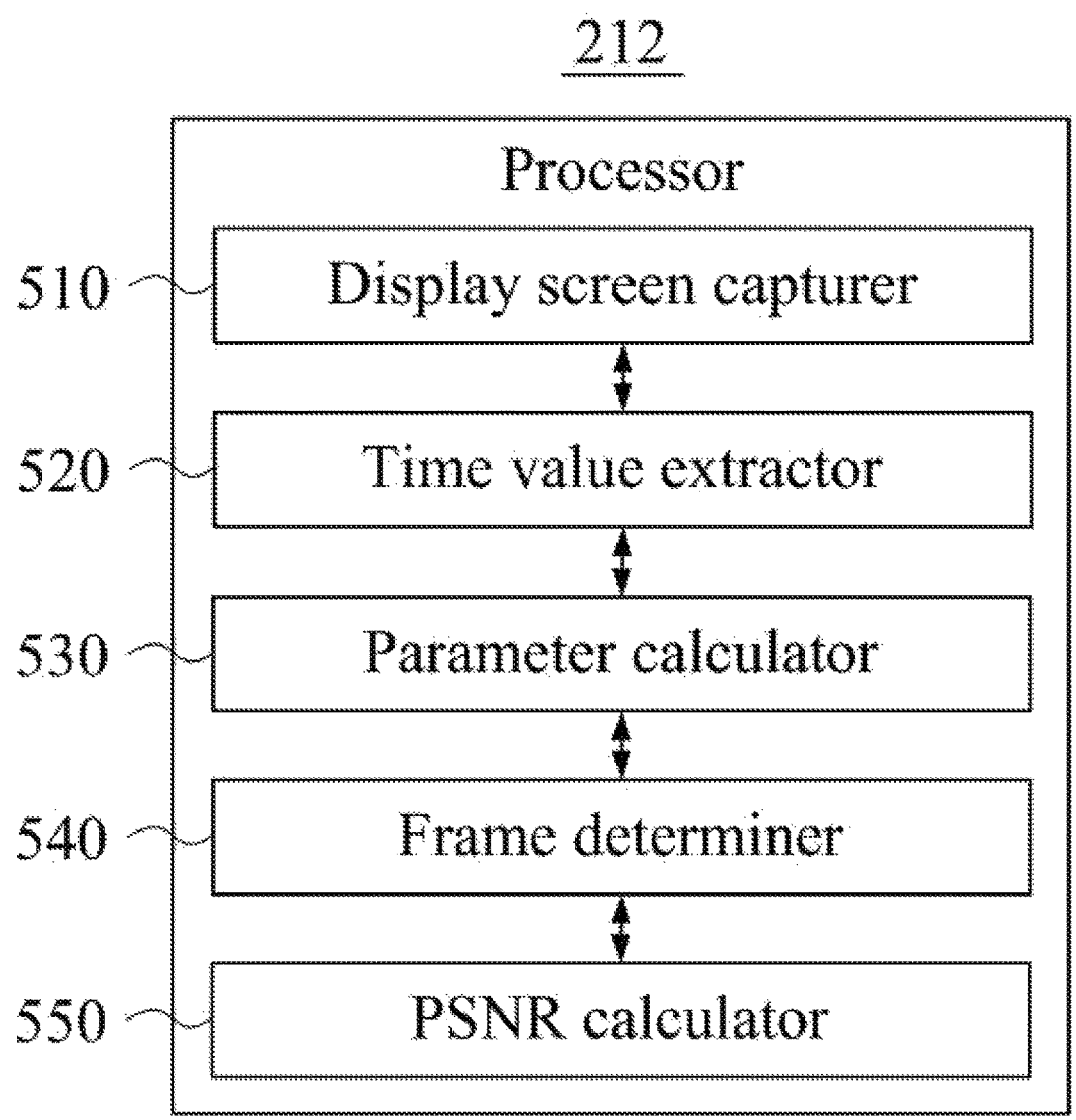
FIG. 5 is a block diagram illustrating an example of components includable in a processor of an electronic device according to at least one example embodiment.
Figure 6:
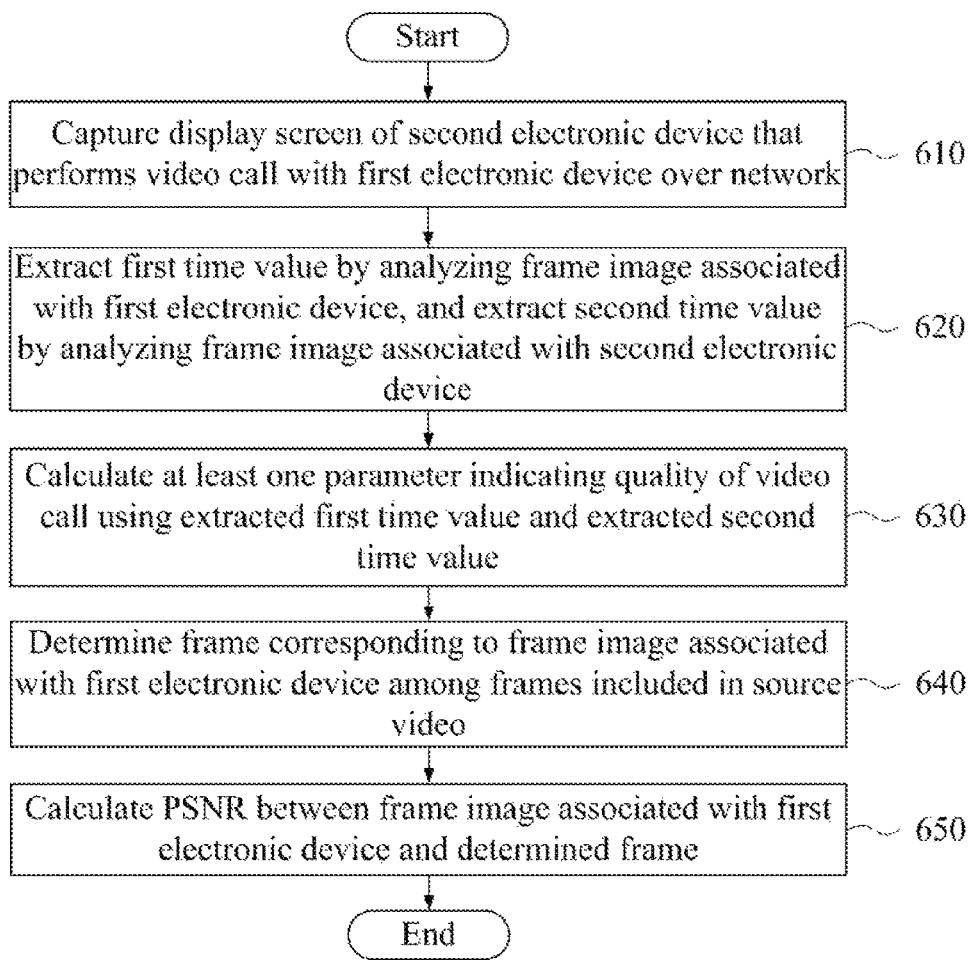
FIG. 6 is a flowchart illustrating an example of a method performed by an electronic device according to at least one example embodiment.

FIG. 5 is a block diagram illustrating an example of components includable in at least one processor of an electronic device according to at least one example embodiment, and FIG. 6 is a flowchart illustrating an example of a method performed by an electronic device according to at least one example embodiment.

Referring to FIG. 5, the electronic device 110 according to the example embodiment may correspond to the quality-of-video call measuring apparatus 310 of FIGS. 3 and 4, and the at least one processor 212 of the electronic device 110 may include at least a display screen capturer 510, a time value extractor 520, and a parameter calculator 530, etc.

Also, the at least one processor 212 may selectively further include a frame determiner 540 and/or a peak signal-to-noise ratio (PSNR) calculator 550.

The processor 212 and the components of the processor 212 may perform operations 610 through 650 included in the quality-of-video call measuring method of FIG. 6. Here, the processor 212 and the components of the processor 212 may be configured to execute a control instruction (e.g., computer readable instructions) according to a code of at least one program or a code of the OS included in the memory 211. Here, the components of the processor 212 may be representations of different functions of the processor 212 performed by the processor 212 in response to a control instruction provided from a code stored in the electronic device 110. For example, the display screen capturer 510 may be used as a functional representation of the processor 212 that controls the electronic device 110 to capture a display screen in response to the control instruction.

Referring to FIG. 6, in operation 610, the display screen capturer 510 may capture a display screen of a second electronic device that performs a video call with a first electronic device over a network, but is not limited thereto. The first electronic device and the second electronic device may correspond to the first electronic device 320 and the second electronic device 330, respectively, which are described with FIGS. 3 and 4. Also, the network may correspond to the network 170 described above with FIGS. 1 and 2. Here, the captured display screen may include a frame image associated with the first electronic device and a frame image associated with the second electronic device. The frame image associated with the first electronic device may include at least one time value, such as the first time value, and the frame image associated with the second electronic device may include at least one time value, such as the second time value.

In operation 620, the time value extractor 520 may extract a plurality of time values, such as the first time value by analyzing the frame image associated with the first electronic device, and the second time value by analyzing the frame image associated with the second electronic device, etc. The first time value may be a value used to identify the frame image associated with the first electronic device that is displayed on the captured display screen. The second time value may be a value used to identify the frame image associated with the second electronic device that is displayed on the captured display screen.

In detail, the video call between the first electronic device and the second electronic device may include a test video call that is performed in such a manner that each of the first electronic device and the second electronic device transmits the same source video to a counter party (e.g., another party) of the video call. Here, a plurality of frames included in the source video may sequentially include consecutive time values at desired and/or preset time intervals. For example, a first frame of the source video may include a time value, such as 00 hour 00 minute 00 second 10 milliseconds as in "00:00:00:010", and a second frame that is a subsequent frame of the first frame may include a time value 00 hour 00 minute 00 second 20 milliseconds as in "00:00:00:020". In this example, a time interval between two time values may be 10 milliseconds. In this case, the frame image associated with the first electronic device may be a first frame among the frames included in the source video that is transmitted from the first electronic device to the second electronic device for the test video call, and may be displayed on at least a portion of a screen of the second electronic device with the first time value corresponding to the first frame.

Also, the frame image associated with the second electronic device may be a second frame among the frames included in the source video that is to be transmitted from the second electronic device to the first electronic device for the test video call and may be displayed on at least a portion of the screen of the second electronic device with the second time value corresponding to the second frame. An example of displaying such first and second frames and first and second time values is described with reference to FIG. 4. According to at least one example embodiment, the time values associated with the electronic devices may be synchronized based on a central time value that may be provided by the network 170, the video call service server 340, or at least one of the electronic devices of the video call, etc.

In operation 630, the parameter calculator 530 may calculate at least one parameter indicating the quality of video call using the extracted first time value and the extracted second time value.

For example, the parameter calculator 530 may calculate a difference value between the second time value and the first time value as a parameter for an end-to-end delay between the second electronic device and the first electronic device. The frame image associated with the first electronic device and the frame image associated with the second electronic device that are simultaneously displayed on the display screen of the second electronic device are highly likely to be different frames of the source video due to a network delay, a processing delay, a reproduction delay, and/or other delays. Accordingly, the frame image associated with the first electronic device and the frame image associated with the second electronic device may have different time values, respectively. The entire delay between the first electronic device and the second electronic device may be calculated based on a difference value between the different time values. Additionally, the parameter calculator 530 may also calculate an picture quality value of the frame images associated with the first electronic device and the second electronic device, a frames per second value for each of the frame images, an image resolution value of each of the frame images, etc., as the parameters indicating the quality of the video call.

Figure 7:
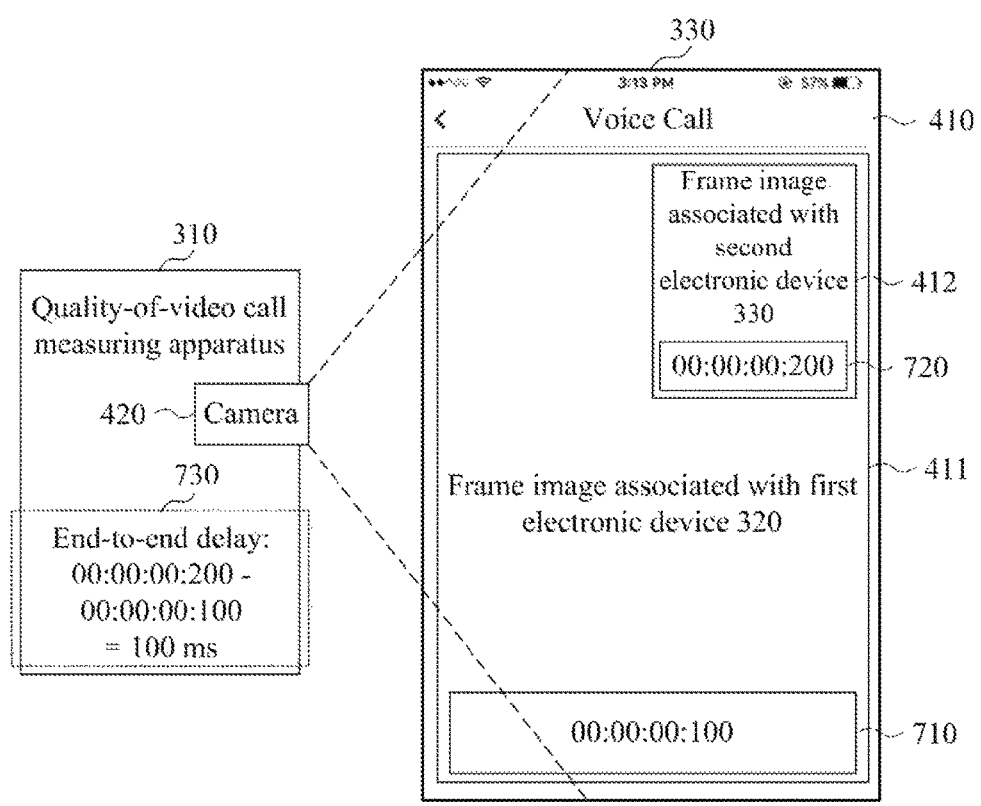
FIG. 7 illustrates an example of calculating an end-to-end delay according to at least one example embodiment.

FIG. 7 illustrates an example of calculating an end-to-end delay according to at least one example embodiment. FIG. 7 illustrates an example in which "00:00:00:100" 710 and "00:00:00:200" 720 are displayed as time values on the screen 410 of FIG. 4. Here, the time value extractor 520 may extract first time value "00:00:00:100" and second time value "00:00:00:200" from the captured display screen. One of video analysis schemes known to extract a text from an image may be used to extract a time value as above.

In this case, as shown in a box 730 indicated with dotted lines, the parameter calculator 530 may calculate a difference value between the second time value "00:00:00:200" and the first time value "00:00:00:100" and may acquire 100 milliseconds as an end-to-end delay. That is, when a frame image that includes the second time value "00:00:00:200" is transmitted from the second electronic device 330, a frame image that includes the first time value "00:00:00:100" may be received from the first electronic device 320 due to a network delay and the like. Accordingly, the frame images that include different time values, respectively, may be simultaneously displayed on the display screen 410 of the second electronic device 330. Accordingly, a difference value between the first time value and the second time value may be used as a value of a delay that has occurred between two terminals, for example, the first electronic device 320 and the second electronic device 330, during the video call.

Referring again to FIGS. 5 and 6, the display screen capturer 510 may sequentially capture a plurality of display screens. Here, the parameter calculator 530 may calculate a difference value between first time values corresponding to consecutive frames of a source video based on a plurality of first time values, a plurality of second time values, etc., extracted from the plurality of display screens, respectively, and may calculate an inverse number of a minimum value of the calculated difference values as a parameter for FPS.

Figure 8:
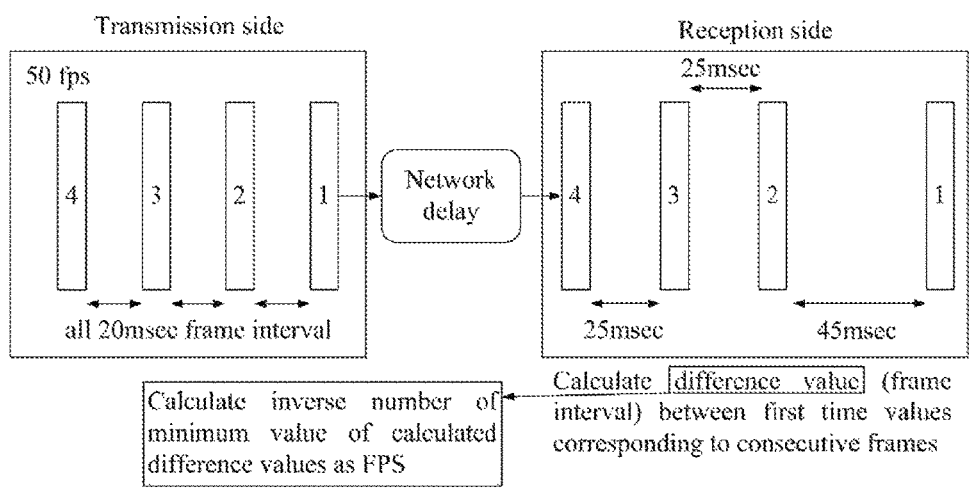
FIG. 8 illustrates an example of a frame interval according to at least one example embodiment.

FIG. 8 illustrates an example of a frame interval according to at least one example embodiment. FIG. 8 illustrates an example of transmitting frames of a source video at 50 FPS from a transmission side. To transmit 50 frames per second, the transmission side may transmit data so that frames may be transmitted at intervals of 20 milliseconds. In reality, it may be difficult to transmit the frames accurately at intervals of 20 milliseconds. Also, due to a network delay, a transmission error, etc., a reception side may not receive the frames at the desired and/or preset intervals. Here, the parameter calculator 530 may extract a plurality of first time values from the plurality of captured display screens, and may calculate a difference value between the plurality of first time values, as a frame interval between consecutive frames, for example, a frame n and a frame n−1. Here, the parameter calculator 530 may calculate a smallest difference value, for example, an inverse number of a smallest frame interval as a number of frames per second. For example, if the smallest frame interval is 100 milliseconds, 10(=1000/100) FPS may be calculated as a number of frames per second through an inverse number of 100 milliseconds. That is, although a number of frames per second suggested by a service provider is 50 FPS, a number of frames per second actually measured from perspective of a user may be 10 FPS. In the example of FIG. 8, if 25 milliseconds is a minimum frame interval and/or a desired frame interval, 40(=1000/25) FPS may be a number of frames measured per second.

Referring again to FIGS. 5 and 6, the parameter calculator 530 may calculate at least one of a moving average and a cumulative distribution with respect to a frame interval between frames of the source video by using the calculated difference value as the frame interval. Here, the frame interval may be used to determine a level of a video that is viewed naturally from perspective of the user. The frame interval may be defined as video frame delta (vfdt). Here, vfdt(n) may indicate a frame interval between consecutive frames n and n−1. Also, the moving average of vfdt(n) may be defined as MA(n) and the cumulative distribution from vfdt(1) to vfdt(n) may be defined as CDF(n).

In this case, the moving average MA(n) may be calculated according to the following Equation 1.

$$MA(n)=a*MA(n-1)+b*vfdt(n) \quad \text{[Equation 1]}$$

In Equation 1, "a" denotes a weight for a proportion of a previous value and "b" denotes a weight for a proportion of a current value. According to an increase in the proportion of the current value, an inconsistent level between frame intervals may be relatively greatly applied to the moving average MA(n). For example, a may have a desired and/or preset of 0.9 and b may have a desired and/or preset value of 0.1. A sum of a and b may have a value of '1'. If the calculated moving average is represented as a graph that uses a time as an X axis, it is possible to observe a change in quality of experience (QoE).

Also, the cumulative distribution CDF(n) may be used to determine whether the QoE is enhanced by a network error, a functional development, etc. As the cumulative distribution CDF(n) may be maintained as a single value, it may indicate that a video may be played relatively consistently. If an intermediate value of the cumulative distribution CDF(n) is low, it may indicate that FPS is relatively high.

Referring again to FIGS. 5 and 6, in operation 640, the frame determiner 540 may determine a frame corresponding to the frame image associated with the first electronic device among the frames included in the source video. The quality-of-video call measuring apparatus 310 may store and/or pre-store the source video and may determine the frame corresponding to the frame image associated with the first electronic device of the captured display screen among the frames included in the source video. In detail, the frame determiner 540 may retrieve a frame having the same time value as a time value included in the frame image associated with the first electronic device from among the frames included in the source video.

In operation 650, the PSNR calculator 550 may calculate a PSNR between the frame image associated with the first electronic device and the determined frame. A method of calculating a PSNR to measure a quality between images may employ a known method as shown in the following URL, which is herein incorporated by reference in its entirety.

"http://homepages.inf.ed.ac.uk/rbf/CVonline/LOCAL_COPIES/VELDHUI ZEN/node18.html"

Various example embodiments may provide various objective parameters, such as an end-to-end delay between the first electronic device and the second electronic device, an FPS, a frame interval, and/or a PSNR, etc.

In the meantime, the aforementioned example embodiments relate to technology for measuring a quality of video call using a quality-of-video call measuring apparatus separate from a first electronic device and a second electronic device. According to other example embodiments, the second electronic device may calculate the aforementioned various parameters under control of an application, for example, a computer program that is installed and executed on the second electronic device. Here, unlike the example embodiments in which the quality-of-video call measuring apparatus captures the display screen of the second electronic device, the second electronic device may capture the display screen of the second electronic device under control of the application, may extract a plurality of time values, such as the first and second time values, from the captured display screen, and may calculate various parameters based on the first and second time values. Also, since the source video is stored and/or pre-stored in the second electronic device, the second electronic device may compare a frame selected from among frames of the stored and/or pre-stored source video and the frame image associated with the first electronic device and may calculate a PSNR.

Figure 9:
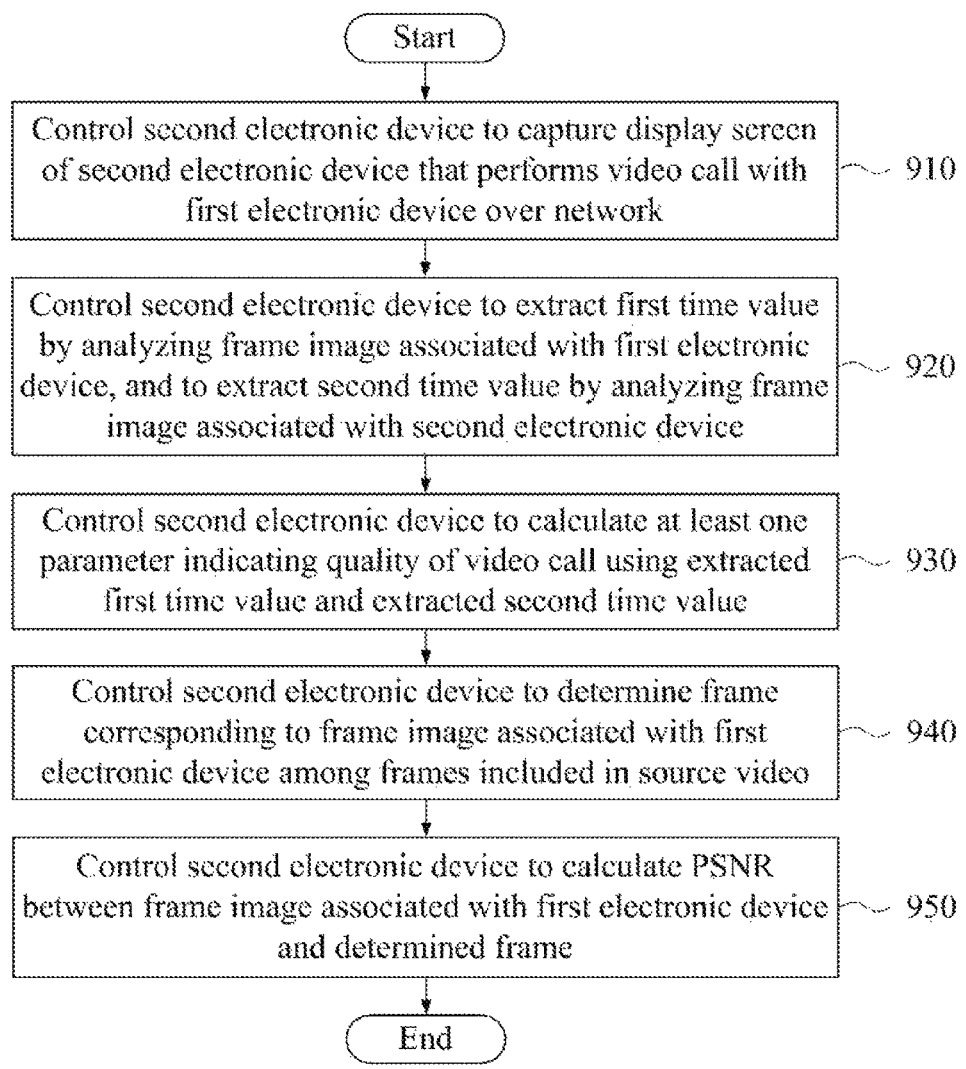
FIG. 9 is a flowchart illustrating an example of a method performed by a second electronic device according to at least one example embodiment.

FIG. 9 is a flowchart illustrating an example of a method performed by a second electronic device according to at least one example embodiment.

The second electronic device according to the example embodiment may correspond to the second electronic device 330 described with FIGS. 3 and 4 and may be configured with the first electronic device 110 described with FIGS. 1 and 2. At least one processor of the second electronic device may perform operations 910 through 950 included in the quality-of-video call measuring method according to the example embodiment of FIG. 9 under control of a computer program including computer readable instructions installed on the second electronic device.

Referring to FIG. 9, in operation 910, the processor of the second electronic device may control the second electronic device to capture a display screen of the second electronic device that performs a video call with a first electronic device over a network. Technology that allows an electronic device to capture a screen of the electronic device may be clearly understood by one skilled in the art.

In operation 920, the processor of the second electronic device may control the second electronic device to analyze the captured display screen, and to extract time values associated with the frame images, such as a first time value included in a frame image associated with the first electronic device and a second time value included in a frame image associated with the second electronic device. For example, the processor of the second electronic device may analyze the frame images associated with the first electronic device and the second electronic device loaded to a memory of the second electronic device and may extract the first time value and the second time value under control of the computer program.

In operation 930, the processor of the second electronic device may control the second electronic device to calculate at least one parameter indicating a quality of video call using the extracted first time value and the extracted second time value. As described above, examples of the parameter may include parameters for an end-to-end delay, an FPS, a frame interval, a moving average and a cumulative distribution of frame intervals, and the like.

In operation 940, the processor of the second electronic device may control the second electronic device to determine a frame corresponding to the frame image associated with the first electronic device among the frames included in the source video.

In operation 950, the processor of the second electronic device may control the second electronic device to calculate a PSNR between the frame image associated with the first electronic device and the determined frame.

A description not described herein may refer to the description made above with reference to FIGS. 1 through 8.

According to some example embodiments, it is possible to include a specific time value in each of a frame image associated with a first electronic device and a frame image associated with a second electronic device performing a video call with the first electronic device over a network, the images being displayed on a display screen of the second electronic device, to capture a display screen of the second electronic device, to extract the specific time values, and to provide objective parameters for measuring a quality of video call using the extracted specific time values. Also, it is possible to provide various objective parameters, for example, an end-to-end delay between a first electronic device and a second electronic device, an FPS, a frame interval, a PSNR, etc.

The systems and or apparatuses described herein may be implemented using hardware components or a combination of hardware components and software components. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, or a non-transitory computer storage medium or device. The software also may be distributed over network coupled computer systems so that the software is stored and executed in a distributed fashion. In particular, the software and data may be stored by one or more non-transitory computer readable recording mediums.

The methods according to the example embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially to store and perform program instructions, such as read-only memory (ROM), random access memory (RAM, flash memory, and the like. Examples of program instructions include both machine code, such as produced by a compiler, and files containing higher level code that may be executed by the computer using an interpreter. The described hardware devices may be to act as one or more software modules in order to perform the operations of the above-described embodiments, or vice versa.

The foregoing description has been provided for purposes of illustration and description. It is not intended to be exhaustive or to limit the disclosure. Individual elements or features of a particular example embodiment are generally not limited to that particular example embodiment, but, where applicable, are interchangeable and can be used in a selected example embodiment, even if not specifically shown or described. The same may also be varied in many ways. Such variations are not to be regarded as a departure from the disclosure, and all such modifications are intended to be included within the scope of the disclosure.

What is claimed is:

1. A quality-of-video call measuring method of a quality-of-video call measuring apparatus, the method comprising:
    capturing, using at least one processor, a display screen of a second electronic device that performs a first video call with a first electronic device over a network, the captured display screen comprising at least one first frame image associated with the first electronic device and at least one second frame image associated with the second electronic device, and the first frame image comprising a first time value and the second frame image comprising a second time value, the first video call including,
        a test video call, the test video call including the first electronic device and the second electronic device both transmitting a first source video to a counter party of the test video call, and
        a plurality of frames included in the first source video sequentially including consecutive time values at desired time intervals;
    analyzing, using the at least one processor, the captured display screen, and extracting the first time value included in the first frame image and the second time value included in the second frame image; and
    calculating, using the at least one processor, at least one parameter indicating a quality of the first video call based on the extracted first time value and the extracted second time value.

2. The method of claim 1, wherein the first frame image is at least one first frame among the plurality of frames included in the first source video that is transmitted from the first electronic device to the second electronic device for the test video call and is displayed on at least a portion of a screen of the second electronic device with the first time value corresponding to the first frame; and
    the second frame image is at least one second frame among the plurality frames included in the first source video that is to be transmitted from the second electronic device to the first electronic device for the test video call and is displayed on at least a portion of the screen of the second electronic device with the second time value corresponding to the second frame.

3. The method of claim 1, wherein the calculating of the at least one parameter comprises calculating a difference value between the first time value and the second time value as a parameter for an end-to-end network delay between the first electronic device and the second electronic device.

4. The method of claim 1, wherein
    the capturing comprises sequentially capturing a plurality of display screens; and
    the calculating of the at least one parameter comprises calculating a difference value between first time values corresponding to consecutive frames of the first source video based on a plurality of first time values extracted from the plurality of display screens, and calculating an inverse number of a minimum value of the calculated difference values as a parameter for a frames per second (FPS) value of the first video call.

5. The method of claim 4, wherein the calculating of the at least one parameter comprises calculating at least one of a moving average and a cumulative distribution with respect to a frame interval between frames of the first source video based on the calculated difference value as the frame interval.

6. The method of claim 1, the method further comprising:
    determining a frame corresponding to the first frame image among a plurality of frames included in the first video call; and
    calculating a peak signal-to-noise ratio (PSNR) between the first frame image and the determined frame.

7. The method of claim 1, wherein the capturing comprises creating an image input in response to photographing the display screen of the second electronic device through a camera included in the quality-of-video call measuring apparatus as the captured display screen.

8. An apparatus for measuring a quality of video call, the apparatus comprising:
    at least one processor configured to execute computer-readable instructions included in a memory to,
        capture a display screen of a second electronic device that performs a first video call with a first electronic device over a network, the captured display screen comprising a first frame image associated with the first electronic device and a second frame image associated with the second electronic device, and the first frame image comprising a first time value and the second frame image comprising a second time value, the first video call including,
a test video call, the test video call including the first electronic device and the second electronic device both transmitting a first source video to a counter party of the test video call, and
a plurality of frames included in the first source video sequentially including consecutive time values at desired time intervals,
analyze the captured display screen, and extract the first time value included in the first frame image and the second time value included in the second frame image, and
calculate at least one parameter indicating a quality of the first video call based on the extracted first time value and the extracted second time value.

9. The apparatus of claim 8, wherein the first frame image is at least one first frame among the plurality of frames included in the first source video that is transmitted from the first electronic device to the second electronic device for the test video call and is displayed on at least a portion of a screen of the second electronic device with the first time value corresponding to the first frame, and
the first frame image associated with the second electronic device is at least one second frame among the plurality of frames included in the first source video that is to be transmitted from the second electronic device to the first electronic device for the test video call and is displayed on at least a portion of the screen of the second electronic device with the second time value corresponding to the second frame.

10. The apparatus of claim 8, wherein the at least one processor is further configured to calculate a difference value between the first time value and the second time value as a parameter for an end-to-end network delay between the first electronic device and the second electronic device.

11. The apparatus of claim 8, wherein
the at least one processor is further configured to,
sequentially capture a plurality of display screens, and calculate difference values between first time values corresponding to consecutive frames of the first source video based on a plurality of first time values extracted from the plurality of display screens, respectively, and to calculate an inverse number of a minimum value of the calculated difference values as a parameter for a-frames per second (FPS).

12. The apparatus of claim 11, wherein the at least one processor is further configured to calculate at least one of a moving average and a cumulative distribution with respect to a frame interval between frames of the first source video based on the calculated difference value as the frame interval.

13. The apparatus of claim 8, wherein the at least one processor is further configured to:
determine a first frame corresponding to the first frame image among a plurality of frames included in the first video call; and
calculate a peak signal-to-noise ratio (PSNR) between the first frame image associated with the first electronic device and the determined frame.

14. The apparatus of claim 8, further comprising:
a camera configured to photograph the display screen of the second electronic device, wherein the at least one processor is further configured to create an image input through the camera as the captured display screen.

15. A non-transitory computer-readable storage medium storing computer readable instructions that, when executed by at least one processor, cause the at least one processor to:
capture a display screen of a second electronic device that performs a first video call with a first electronic device over a network, the captured display screen comprising a first frame image associated with the first electronic device and a second frame image associated with the second electronic device, and the first frame image comprising a first time value and the second frame image comprising a second time value, the first video call including,
a test video call, the test video call including the first electronic device and the second electronic device both transmitting a first source video to a counter party of the test video call, and
a plurality of frames included in the first source video sequentially including consecutive time values at desired time intervals;
analyze the captured display screen, and extracting the first time value included in the first frame image and the second time value included in the second frame image; and
calculate at least one parameter indicating a quality of the first video call based on the extracted first time value and the extracted second time value.

16. The non-transitory computer-readable storage medium of claim 15, wherein the first frame image is a first frame among the plurality of frames included in the first source video that is transmitted from the first electronic device to the second electronic device for the test video call and is displayed on at least a portion of a screen of the second electronic device with the first time value corresponding to the first frame, and
the second frame image associated with the second electronic device is a second frame among the plurality of frames included in the first source video that is to be transmitted from the second electronic device to the first electronic device for the test video call and is displayed on at least a portion of the screen of the second electronic device with the second time value corresponding to the second frame.

17. The non-transitory computer-readable storage medium of claim 15, wherein the calculating of the at least one parameter comprises calculating a difference value between the first time value and the second time value as a parameter for an end-to-end network delay between the first electronic device and the second electronic device.

18. The method of claim 1, the method further comprising:
calculating, using the at least one processor, the at least one parameter indicating the quality of the first video call based on image resolution values of the first frame image and the second frame image.

19. The apparatus of claim 8, wherein the at least one processor is further configured to calculate the at least one parameter indicating the quality of the first video call based on image resolution values of the first frame image and the second frame image.

20. The non-transitory computer-readable storage medium of claim 15, wherein the method further comprises:

calculating the at least one parameter indicating the quality of the first video call based on image resolution values of the first frame image and the second frame image.

* * * * *